(12) United States Patent
Frederiksen

(10) Patent No.: US 8,261,768 B2
(45) Date of Patent: Sep. 11, 2012

(54) DEVICE FOR PREVENTING OVERFILLING OF CONTAINERS, IN PARTICULAR CONTAINERS INTENDED TO CONTAIN LIQUEFIED GASES

(75) Inventor: Niels Frederiksen, Herlev (DK)

(73) Assignee: Cavagna Group Switzerland S.A., Lugano (CH)

( * ) Notice: Subject to any disclaimer, the term of this patent is extended or adjusted under 35 U.S.C. 154(b) by 492 days.

(21) Appl. No.: 12/509,126

(22) Filed: Jul. 24, 2009

(65) Prior Publication Data

US 2010/0024917 A1    Feb. 4, 2010

(30) Foreign Application Priority Data

Jul. 31, 2008  (IT) .............................. PD2008A0234

(51) Int. Cl.
*F16K 31/18*   (2006.01)
(52) U.S. Cl. ......... 137/442; 137/445; 137/446; 141/198
(58) Field of Classification Search .................. 137/442, 137/446, 445; 141/192, 198
See application file for complete search history.

(56) References Cited

U.S. PATENT DOCUMENTS

| | | |
|---|---|---|
| 2,504,638 A | 4/1950 | Browning |
| 3,040,769 A | 6/1962 | Lamb |
| 3,756,269 A | 9/1973 | Brown |
| 4,142,552 A | 3/1979 | Brown et al. |
| 4,541,464 A | 9/1985 | Christiansen |
| 5,921,272 A | 7/1999 | Cavagna |

FOREIGN PATENT DOCUMENTS

| | | |
|---|---|---|
| CH | 106597 | 9/1924 |
| WO | WO 99/47837 | 9/1999 |

*Primary Examiner* — Craig Schneider
(74) *Attorney, Agent, or Firm* — Fay Sharpe LLP

(57) ABSTRACT

A device for preventing overfilling of containers, such as those intended to contain liquefied gases, includes a valve body in which a gas duct is defined and a closure. The closure is axially movable in the valve body away from and towards a valve seat in order to respectively open and shut off the gas duct. An actuator, capable of exerting a thrust, urges the closure away from the seat. The actuator includes a float, a cam mechanism and a lever mechanism. The cam mechanism exerts the thrust in an ascending phase of the float until a preimposed limit position corresponding to a maximum filling level is reached. The lever mechanism exerts the thrust in at least a first part of a descending phase of the float starting from the limit position.

11 Claims, 4 Drawing Sheets

DEVICE FOR PREVENTING OVERFILLING OF CONTAINERS, IN PARTICULAR CONTAINERS INTENDED TO CONTAIN LIQUEFIED GASES

BACKGROUND

1. Technical Environment

The object of the present disclosure is a device for preventing overfilling of containers, in particular containers intended to contain liquefied gases.

2. Prior Art

Such containers, better known as "cylinders," are widely utilized where a connection to the distribution network for fuel gases has not been provided.

For financial and safety reasons it is best that the cylinders should be filled with a predefined maximum quantity of gas, avoiding overfilling and thus excessive internal pressure. For this reason the cylinders are equipped with devices for preventing overfilling, sized to cut off the flow of entering gas when a desired fill level has been reached.

Devices of the type described above are known, for example, to the production of the Applicant and include membrane valves. Such valves are of the type that is normally closed and include a perforated membrane in the center, which, becoming deformed under the action of the entering gas, permits its passage. The gas flow is intercepted when a prearranged level of filling is reached and a piston, placed below the membrane and actuated by a cam connected to a float inside the container, thrusts against a seat, closing one section for passage of the gas. The variation of the sections for passage causes a counter-pressure that acts on the membrane in a direction opposite to that of the gas entering the container, closing the entrance orifice.

The disadvantages of such solutions are those typical of the applications of valves to membranes, i.e., the greater predisposition to wear and tear and the consequent lesser reliability compared to solutions that use valves in which the closure means is a rigid component.

Another inconvenience encountered in the specific application of the device for preventing overfilling of cylinders is represented by the fact that the membrane valve thus conceived makes it difficult to produce a vacuum inside the container.

A further drawback encountered is the reduction of the capacity of exiting gas during normal use.

Devices for preventing overfilling of cylinders that employ valves without membranes are known, for example, from the American patent U.S. Pat. No. 4,541,464. In this solution the valve is spherical, normally open. The obstructing sphere is kept in the open position by means of a pin constructed on a spherical member connected to a float by means of a cam driver. During the filling operation the float comes out of the container so that it causes the spherical member to rotate by means of the driving action of the cam. The system is sized in such a way that when the filling position is reached, the rotation of the spherical member causes a loss of contact between the pin and the sphere, which is thrust into the closed position of the valve by the force of gravity, besides a possible return spring.

A principal drawback of such solutions is represented by the fact of its being sensitive to the inclination and the oscillations of the cylinder, also from the moment that the spherical member rotates as an effect of any kind of deviation of the cylinder's axis from the vertical position.

A second problem is represented by the sluggish speed of the system once the maximum fill level of the cylinder has been reached.

A further problem with this solution is determined by the number of elements that compose it and the use of spherical members that complicate the operations of construction and assembly, making the device particularly sensitive to size tolerances and coupling. For the same reasons, the reliability of this solution in use is limited.

DESCRIPTION OF THE INVENTION

The main purpose of the invention is to make available a device for preventing overfilling of containers, in particular devices intended to contain liquefied compressed gas, structurally and functionally conceived so as to avoid all the drawbacks complained of with reference to the prior art cited.

This and other purposes that will appear in what follows are confronted and achieved by the invention by means of a device for preventing overfilling of containers accomplished in accordance with the claims that follow.

BRIEF DESCRIPTION OF THE DRAWINGS

The characteristics and advantages of the disclosure will be better shown by the following detailed description of a preferred example of the device, illustrated by way of example but not limitative, with reference to the units drawn in which.

PREFERRED MODE OF ACTUATING THE INVENTION

Figure 1:
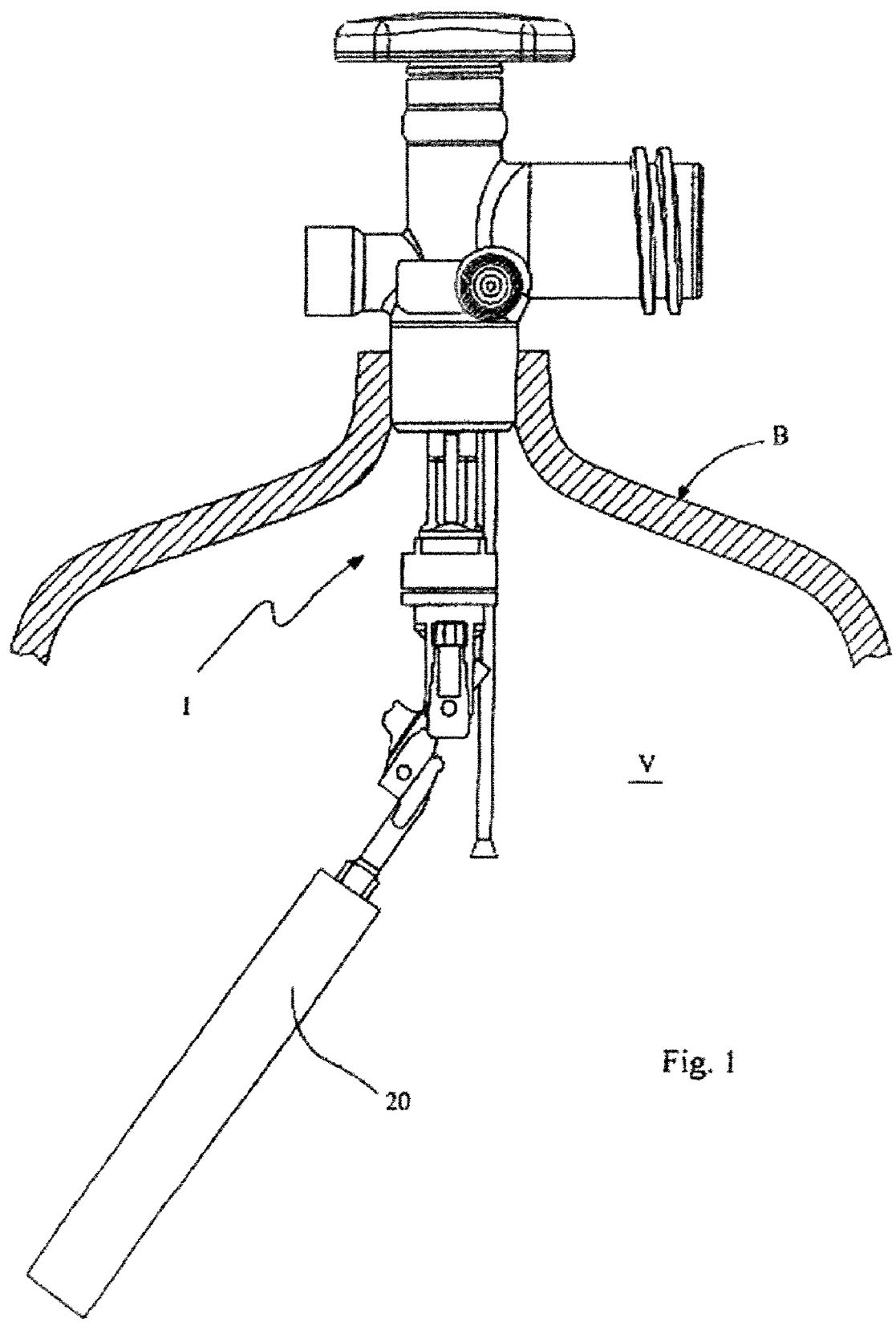
FIG. 1 is a lateral view of a device for preventing overfilling according to the present invention.
Figure 2:
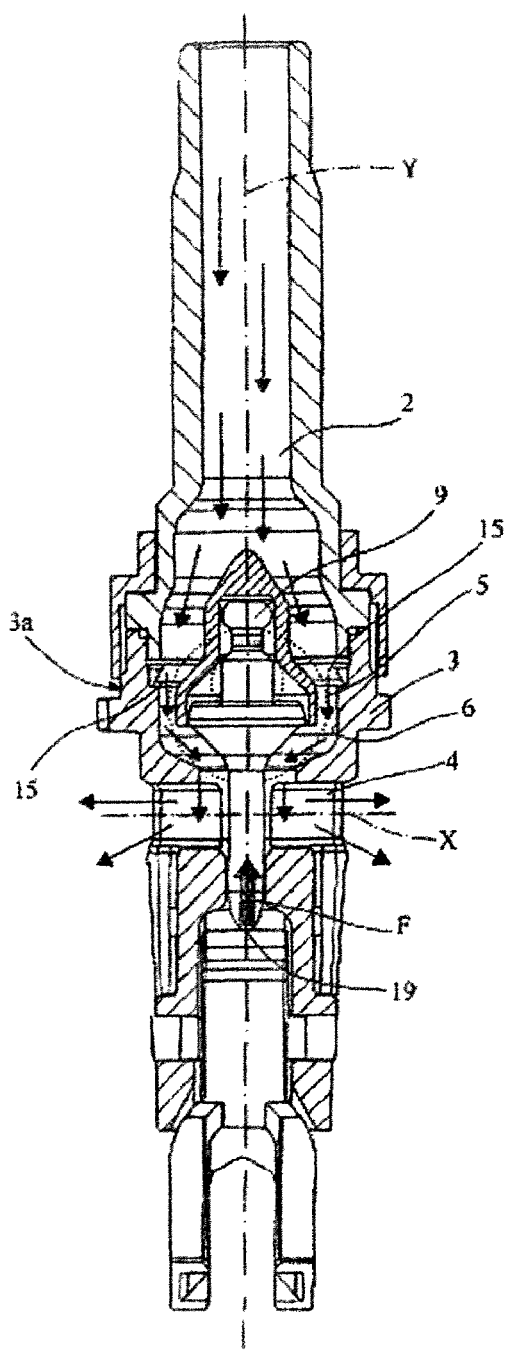
FIG. 2 is a frontal-section view of the device of FIG. 1.
Figure 3:
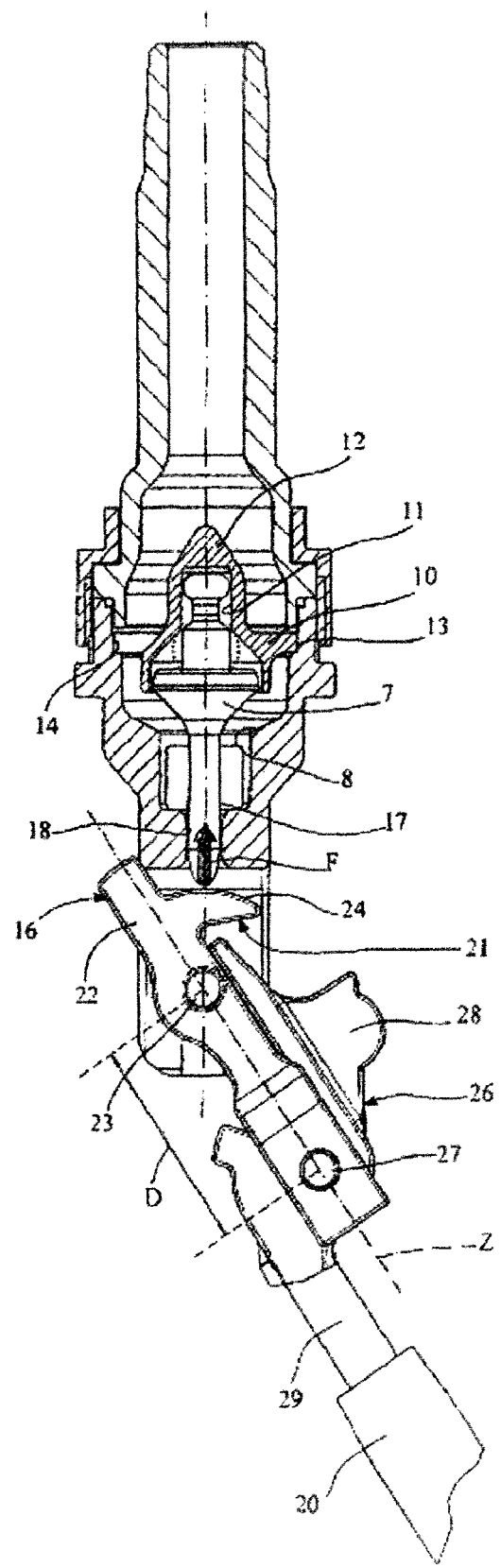
FIG. 3 is a lateral-section view of the device of FIG. 1.

In the figures, 1 is a comprehensive indication of a device for preventing overfilling of containers according to the present invention. Device 1 is intended to be applied to a container (cylinder B) for liquefied gas under pressure. Device 1 includes an upper channel 2 which has a longitudinal axis Y, connected to the pipe union for supplying and filling of cylinder B.

Below channel 2, device 1 comprises a valve 3a, below which is installed a lower channel 4 with axis X orthogonal to axis Y, connected with an internal volume V of the cylinder, of known cylindrical form with rounded bottoms, intended to collect the liquefied gas stored in cylinder B.

Valve 3a comprises a valve body 3, interposed between channels 2 and 4, in which is defined a gas duct 5 entering the cylinder, extended mainly along the direction of axis Y. The gas duct 5 is delimited, in the directions transversal to axis Y, by an internal surface 6 of valve body 3.

Valve 3a comprises a rigid closure means 7 having the shape of a truncated cone, on axis Y with the tapered part turned toward channel 4, axially movable in valve body 3 from and toward a valve seat 8 in order to respectively open and intercept gas duct 5.

Closure means 7 comprises a bottom surface turned toward channel 2, from which rises an appendix 9, having a circular base and longitudinally extended along axis Y.

Valve 3a furthermore comprises a guide element 10, in which is defined a cylindrical cavity 11, along axis Y, in which appendix 9 is smoothly contained.

Guide element 10, on the side axially opposite to the cavity 11, comprises a central arch 12, capable of being entered by the flow of gas entering the cylinder. Guide element 10 is integral with valve body 3, being equipped with a perimetric annular protuberance 13, partially nested in an annular seat 14, located on the inner surface 6 of valve body 3.

Annular protuberance 13 is transverse to axis Y and is provided with a plurality of passages 15, to allow for the flow of entering gas to valve seat 8.

Valve 3a comprises a control rod 17, associated with closure means 7, being constructed as a piece with it. Rod 17 is longitudinally extended along axis Y, in a position axially opposite with respect to the appendix 9.

According to other variations of the present invention (not shown), in place of valve 3a other types of valves may be used, for example valves with a membranous closure means controlled by means of a control rod extended longitudinally, analogous to rod 17.

Control rod 17 crosses channel 4, above which it is bound in a cylindrical axial guide 18, integral to valve body 3 and working together with guide element 10 to axially guide closure means 7. Control rod 17 furthermore comprises an end 19, axially opposite closure means 7.

Device 1 comprises an actuator 16 that can exert a thrusting force F on end 19 of rod 17 in order to urge closure means 7 away from valve seat 8.

Actuator 16 comprises a float 20, extended inside the interior volume V of cylinder B, and a cam mechanism 21 to exert the thrust F, in a rising phase of float 20. Thrust F is exerted until it reaches an extreme position preset by float 20, corresponding to a maximum fill level of cylinder B.

Figure 4:
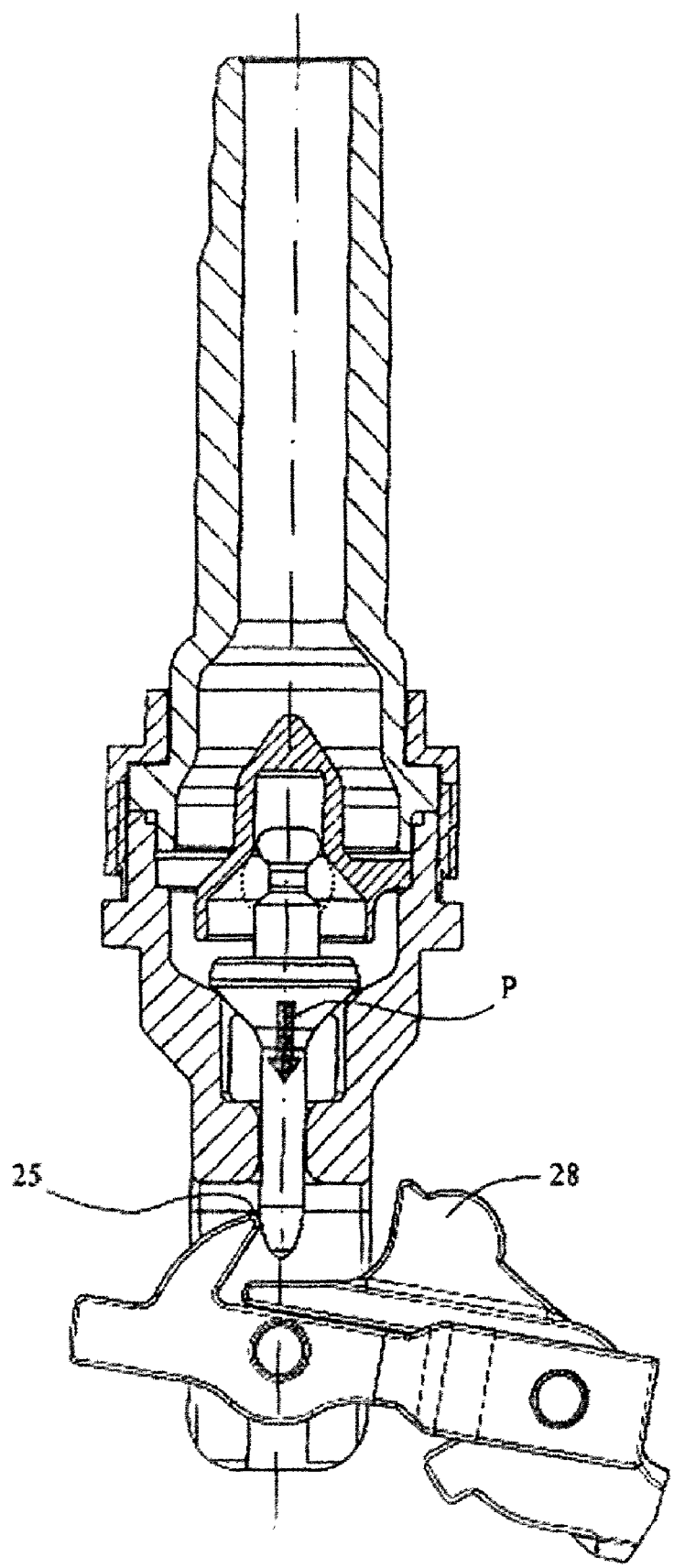
FIG. 4 is a sectional view corresponding to the one in FIG. 3, in a different operating state of the device of the present invention.
Figure 5:
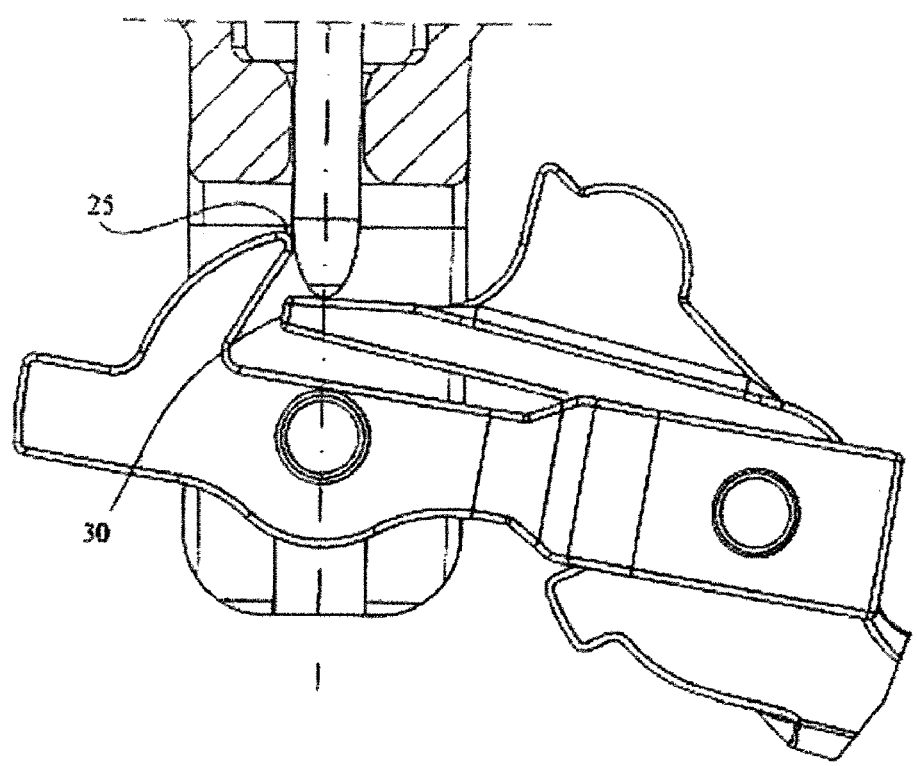
FIGS. 5 and 6 are two lateral sections of two details of the device shown in FIG. 1, in two respective operating states.

Mechanism 21 comprises a member 22, linked to valve body 3 by a hinge 23, on which a cam profile 24 is defined. The cam profile 24 is compatible with closure means 7 in order to exert thrust F until it meets end 19 of control rod 17. During the upward-traveling phase of float 20, end 19 of rod 17 slides on cam profile 24 until it reaches an end point 25 (FIG. 4).

Cam profile 24 is an arc of a circle with its center on hinge 23 so as to hold closure means 7 at a constant distance from valve seat 8. Cam profile 24 is sized in such a way that when float 20 has reached the extreme position of maximum filling, end 19 is placed in correspondence with point 25. In this state, thrust F cannot be exerted, and closure means 7 thus becomes subject only to its own force weight P, which causes closure means 7 to fall toward valve seat 8 so as to intercept gas duct 5.

According to a constructible variant (not shown) of the present invention, the fall of closure means 7 is caused, in addition to weight P, by a return spring.

Actuator 16 furthermore comprises a lever mechanism 26 for exerting thrust F on rod 17 in a first stage of descent of float 20 starting from its extreme point of maximum filling.

Lever device 26 comprises a fulcrum 27, hinged to member 22 at distance D from hinge 23, and a first arm 28 extended from fulcrum 27 toward cam profile 24. First arm 28 [is] compatible with closure means 7 by exerting thrust F, until it meets end 19 of control rod 17 and a second arm 29. Fulcrum 27 is interposed between first arm 28 and a second arm 29, integral to float 20. First arm 28 and cam profile 24 are positioned from the same part with respect to straight line Z, which joins hinge 23 and fulcrum 27.

During the upward-moving phase of float 20, arms 28 and 29 place themselves in a position aligned with member 22, in such a way that first arm 28 can rest against member 22.

Figure 6:
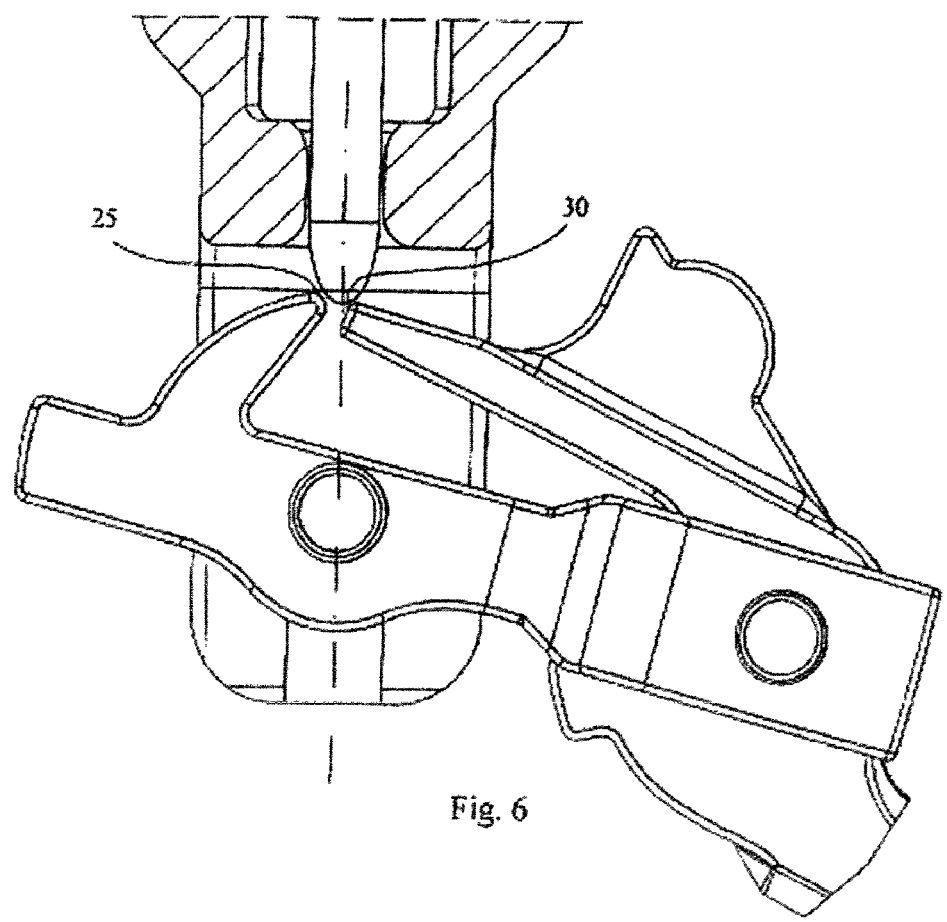

During the descent phase of float 20, end 19 of rod 17 slides on first arm 28 until it reaches an end 30 of first arm 28 in correspondence with an intermediate position of float 20 (FIG. 6).

In correspondence with the intermediate position of float 20, the point of end 25 of cam profile 24 and end 30 of first arm 28 are adjacent to each other. Besides the intermediate position, in a second part of the upward-moving phase of float 20, end 19 of rod 17 moves on cam profile 24.

The functioning of lever mechanism 26 described above thus permits the rearming of cam mechanism 21, in such a way that end 19 of rod 17 can move on cam profile 24 when the level of cylinder B is lower than the intermediate one, in particular when cylinder B is empty.

The present invention allows us to obtain a device for preventing overfilling of containers capable of responding quickly when the maximum fill level is reset.

This device does not experience variations of pressure during the filling of the cylinder.

The reduced number, compared to other known solutions, of valve components permits the achievement of greater simplicity in the functional geometries and, consequently, fewer rejects in production and greater dependability in usage.

In this way the invention fulfills the proposed purpose, at the same time achieving numerous advantages, among which are:

a) the use of a valve of the type that is always open allows better performance with respect to implementing the vacuum in cylinders.

b) the phenomenon of interrupting filling before it is completed is reduced;

c) performance does not depend on the pressure or density of the fluid being handled;

d) repetitiveness of the filling operations is improved, because of reduction of variability in the maximum level actually achieved inside of the cylinder in several successive filling operations.

The invention claimed is:

1. Device for preventing overfilling of containers intended to contain liquefied gases, comprising:
   a valve body in which a gas duct is defined,
   a closure means axially movable in said valve body away from and towards a valve seat in order to open and to shut off said gas duct,
   an actuator capable of exerting a thrust to urge said closure means away from said seat, said actuator comprising a float,
   wherein the actuator comprises:
   a cam mechanism for exerting said thrust in an ascending phase of said float until preimposed limit position, corresponding to a maximum filling level, is reached, and comprising a member linked to the valve body by means of a hinge, the member comprising a cam profile that can be associated with the closure means in order to exert said thrust; and
   a lever mechanism for exerting said thrust in at least a first part of a descending phase of said float, starting from said limit position, the lever mechanism comprising a fulcrum hinged to the member in a distal position with respect to the hinge.

2. Device according to claim 1, wherein said lever comprises a first arm that can be associated with said closure means in order to exert said thrust.

3. Device according to claim 2, wherein said lever comprises a second arm, integral with said float.

4. Device according to claim 2, wherein said first arm is located, with respect to the straight line joining said fulcrum and said hinge, on the same side as said cam profile.

5. Device according to claim 4, wherein said first arm is capable of meeting said member in said ascending phase of said float.

6. Device according to claim 1, wherein said cam profile and said first arm of said lever are capable of meeting a control stem associated with said closure means in order to exert said thrust.

7. Device according to claim 6, wherein said end of said stem slides on said cam profile during the ascending phase of said float, until an end point of said cam profile, corresponding to said limit position, is reached.

8. Device according to claim 7, wherein said cam profile is an arc of a circle having its centre on the axis of said hinge.

9. Device according to claim 8, wherein said end of said stem slides on said first arm of said lever during said first part of said descending phase, until an end of said first arm is reached, at an intermediate position of said float.

10. Device according to claim 9, wherein at said intermediate position said end point of said cam profile and end of said first arm are adjacent to each other.

11. Device according to claim 10, wherein in at least a second part of a descending phase of said float, starting from said intermediate position of said float, said stem bears on said cam profile.

* * * * *